Aug. 24, 1965   J. R. KOBELT   3,202,011
MARINE CONTROL APPARATUS
Filed May 6, 1963   5 Sheets-Sheet 2
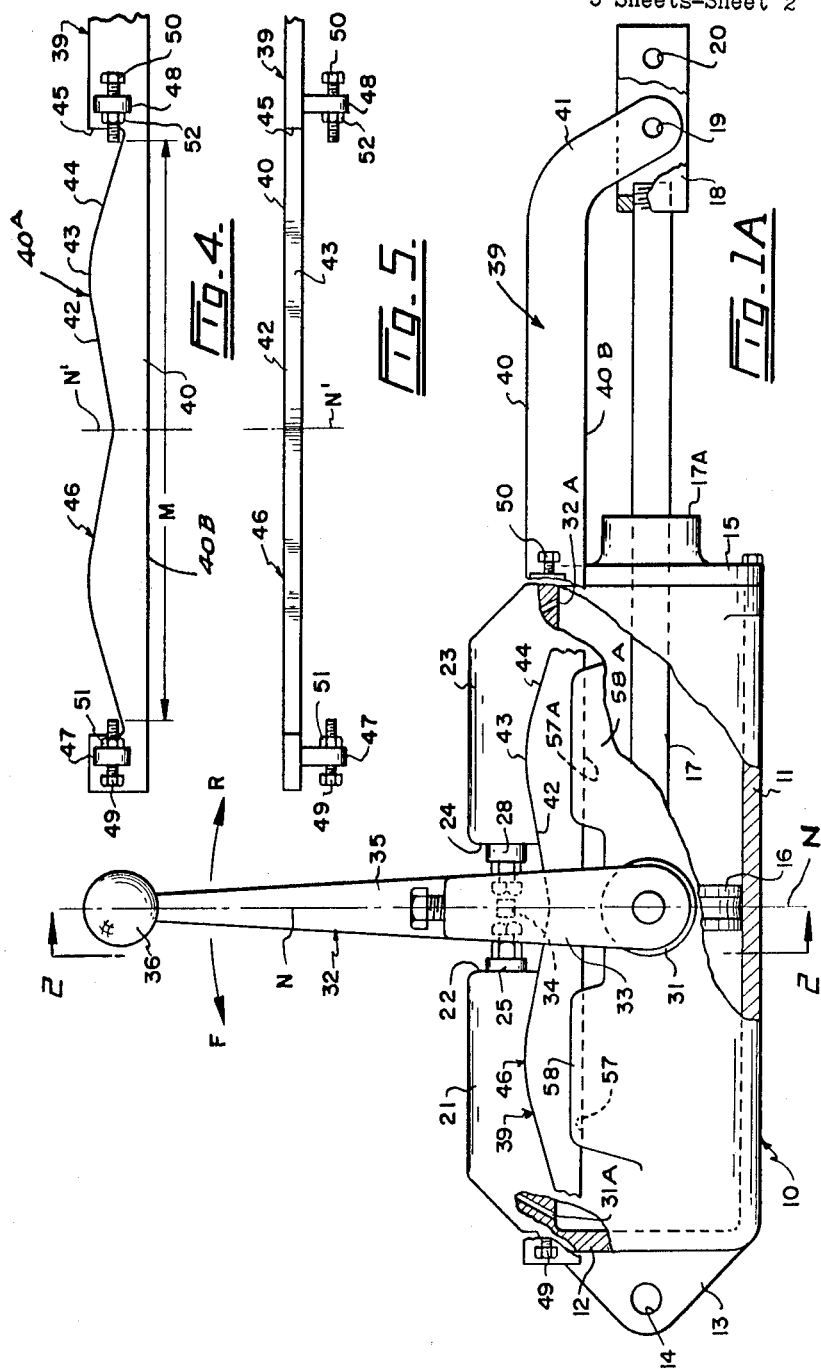
INVENTOR
JACK R. KOBELT Aug. 24, 1965  J. R. KOBELT  3,202,011

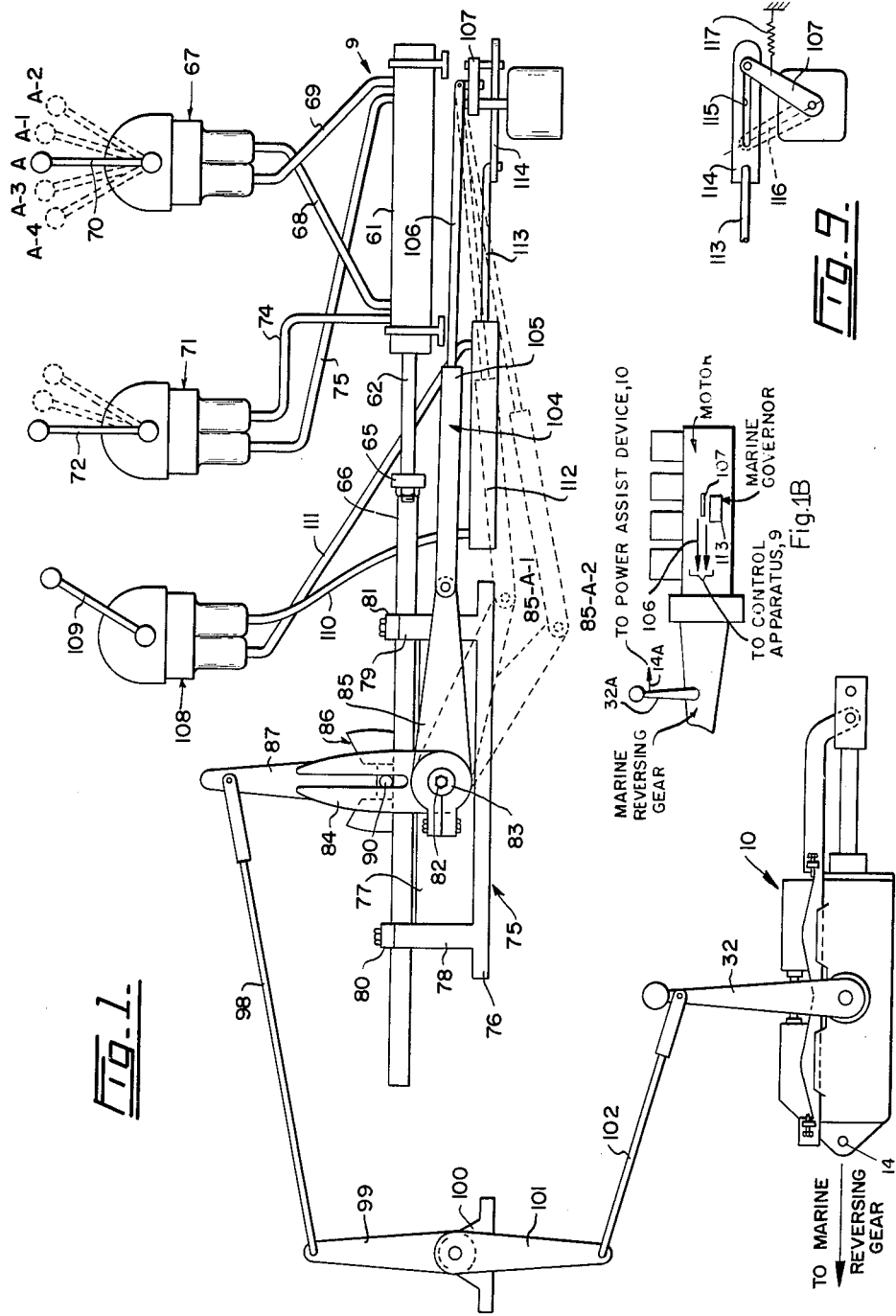

MARINE CONTROL APPARATUS

Filed May 6, 1963   5 Sheets-Sheet 3

INVENTOR
JACK R. KOBELT

INVENTOR
JACK R. KOBELT

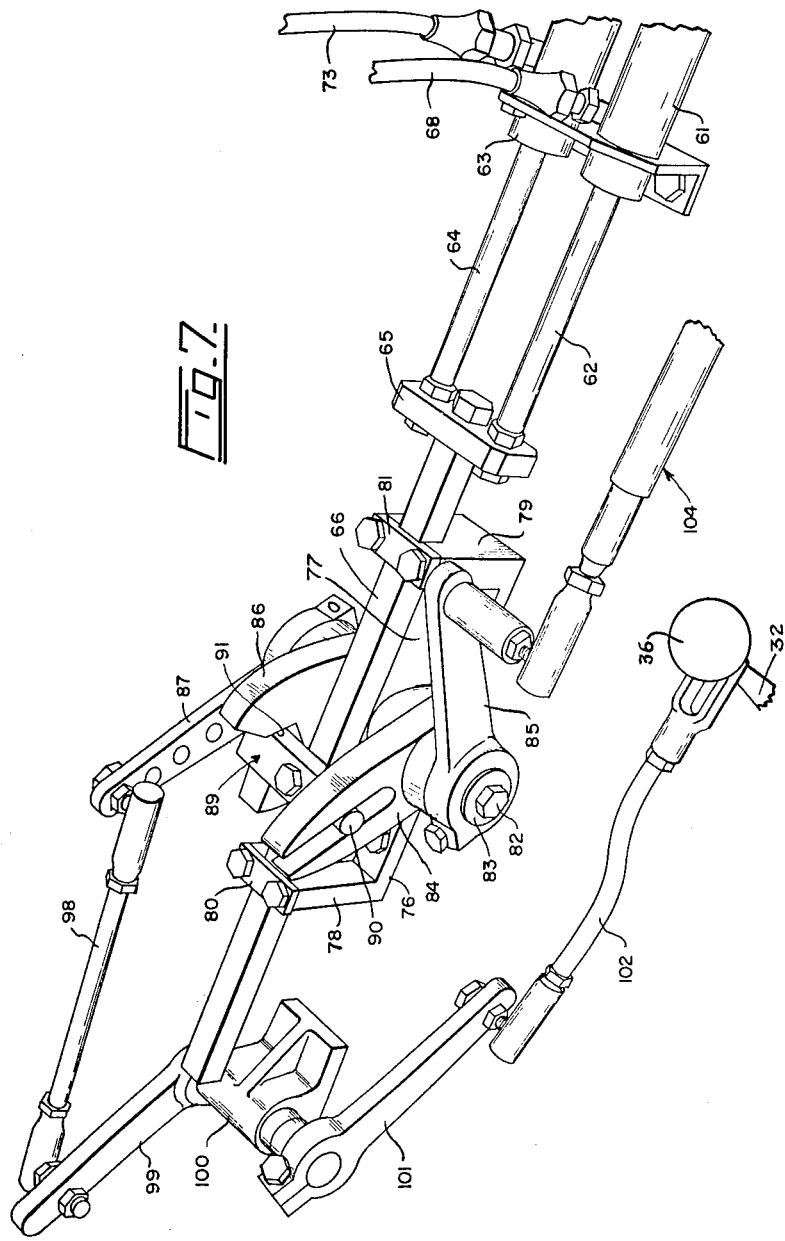

United States Patent Office 3,202,011
Patented Aug. 24, 1965

3,202,011
MARINE CONTROL APPARATUS
Jack R. Kobelt, 3236 Dumfries St., Vancouver 12,
British Columbia, Canada
Filed May 6, 1963, Ser. No. 278,220
10 Claims. (Cl. 74—472)

The invention relates to apparatus used to control, for example, a marine diesel installation with a marine reversing gear. The speed of the motor is controlled movement of a lever of a speed regulating device. Such reversing gears may be difficult to operate manually and, further, it is often desirable to be able to engage and disengage the gear from one or more positions remote from the motor as well as at the motor itself. For these and other reasons power assist devices have been developed. The present invention is particularly adapted for use with a power assist device in which the "feel" of manual engagement and disengagement is preserved.

The invention further provides control, suitably hydraulic, whereby initial motion of a single control lever at one of the said stations shall, according to whether it is moved forward or backwards from a central position, engage forward or reverse gear by means of such a power assist. This hydraulic control is such as to reflect the feel preserved or simulated by the power assist.

In the apparatus of the invention, continued movement of the control lever, forward or backward as the case may be, operates the lever of the speed regulating device. It is to be understood the initial motion of the lever aforesaid operates to engage the gear only, and that the speed regulating device remains at slow or idle until such engagement is accomplished. Speed is reduced, and the gear disengaged, by motion of the control lever in sequence opposite to that described above.

For a number of reasons, for example when operating a winch or charging batteries, it is desirable to be able to control the speed of the motor, by means independent of the control above, while the gear is disengaged.

Figure 2:
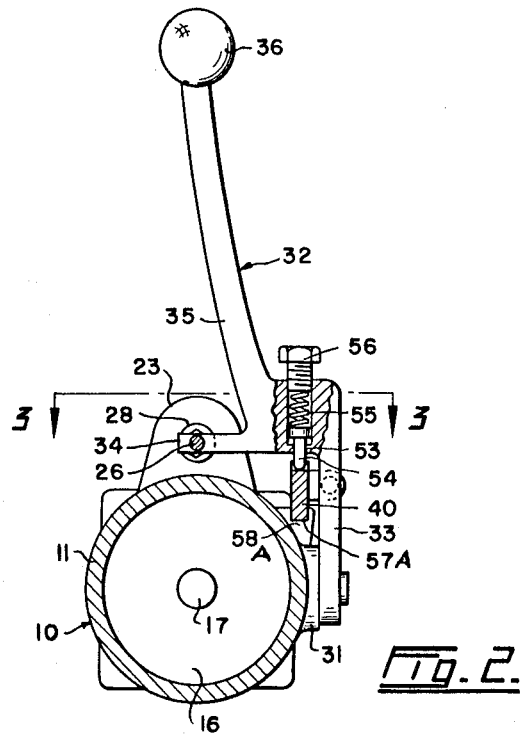
Figure 3:
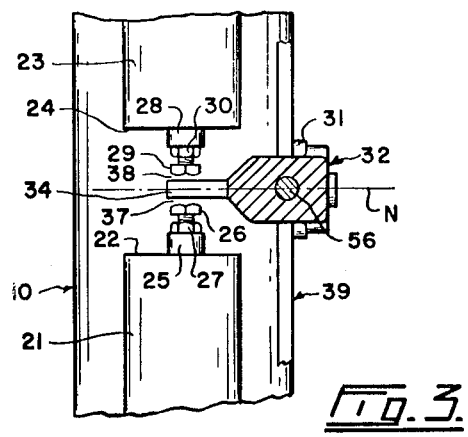
Figure 6:
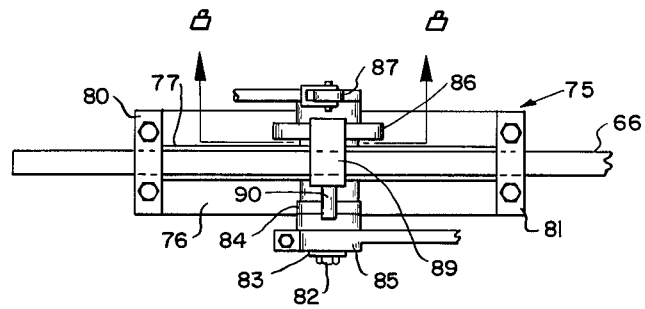
Figure 8:
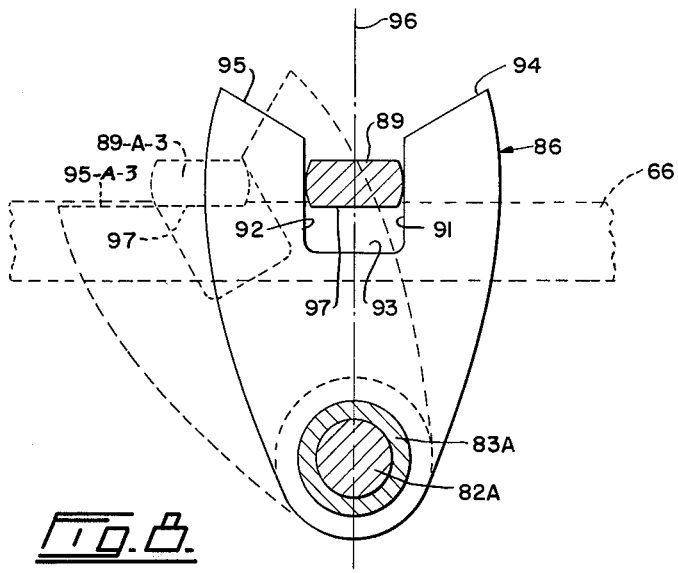

The manner in which these and other provisions and objects of the invention are accomplished will be understood from the following description, taken in conjunction with the drawings, in which:

FIGURE 1 is an elevation showing generally the elements comprising the invention, FIGURE 1A is a partly fragmented elevation of the power assist device, FIGURE 1B is a small scale elevation showing diagrammatically the operative connections of the control apparatus of the invention to a marine power installation, FIGURE 2 is a section on line 2—2 of FIGURE 1A, FIGURE 3 is a section on line 3—3 of FIGURE 2, FIGURE 4 is an elevation of the straight portion of the plate cam of the power assist device, FIGURE 5 is a plan view of FIGURE 4, FIGURE 6 is a plan of the control assembly in the neutral position, FIGURE 7 is a perspective view showing the central linkage positions corresponding to control level position A–3, FIGURE 8 is a diagrammatic representation at enlarged scale of a section on line 8—8 of FIGURE 6, FIGURE 9 is a plan view of the speed regulating device with certain control linkage removed.

FIGURE 1 shows the general disposition of the control apparatus and the various elements thereof. The numeral 10 indicates generally the double acting pneumatic cylinder of a power assist device. Referring to FIGURE 1A the said cylinder comprises the side-wall 11 and the integral end wall 12 central of which is the triangular web 13 containing the bolt hole 14. At the opposite end of the cylinder is the head 15 obviously bolted to the cylinder side-wall 11 by suitable means. Within said cylinder is the piston 16 having a piston rod 17. The cylinder head 15 contains the conventional gland 17A through which said piston rod passes. To the extremity of the piston rod 17 remote from the piston 16 is attached the clevis 18 containing an inner hole 19 and outer hole 20.

As best seen in FIGURE 3 upon the top of the outer periphery of the cylinder side wall 11 is formed the left housing 21 having a face 22, a right housing 23 is similar and has the face 24, said faces disposed so as to be opposite one another. A cylinder or plunger 25 protrudes slidably through a suitable opening in face 22, and said plunger is drilled and tapped to receive the square headed adjusting bolt 26, having locknut securing means 27. Similarly, a plunger 28, having an adjusting bolt 29 with locknut securing means 30, passes slidably through the opposing face 24 of the right hand housing 23. The plungers 25 and 28 of the left and right hand housings aforesaid are aligned, and are parallel to the axis of the piston rod 17.

As shown in FIGURE 1A only, at the left hand end of the cylinder adjacent the end wall 12 is the air entrance and discharge passage 31A, and a similar entrance and discharge passage 32A is provided adjacent the cylinder head 15 at the right hand end of the cylinder.

Within the left housing 21 is a conventional air valve not shown actuated by the plunger 25, see FIGURE 3, the plunger being shown in the "closed" position, in which position it is normally held by internal spring means, not shown. When said plunger is "closed," passage 31A communicates directly to the air outside of the cylinder. The air valve is such that when plunger 25 is caused to move to the left, passage 31A no longer is connected to the outside air but is connected to a source of air under suitable pressure. Thus, when the plunger 25 is moved to the left to an "open" position, air under pressure enters the cylinder 10 via the passage 31A and urges the piston 16 to the right. Within the right hand housing 23 is a similar valve (also not shown), thus with the right hand plunger 28 moved to the "open" position air will enter the cylinder through passage 32A and, plunger 25 being in the "closed" position, the piston will move to the left, the air in front of the piston escaping freely through passage 31A. Air supply arrangements, and the valves, are according to common practice and therefore are not shown nor described in detail.

As best seen in FIGURE 2, a section on line 2—2 of FIGURE 1A, a boss 31 is formed upon a side of the outer periphery of the cylinder 10 upon which boss is swingingly mounted a lever generally indicated by the numeral 32.

Lever 32 comprises a lower vertical portion 33, a tongue portion 34 at right angles to 33, and a curved portion 35 suitably terminating in a knob 36.

FIGURE 3, shows particularly the position of the tongue 34 with respect to the valve actuating plungers 25 and 28, the lever 32 being in the vertical, or neutral, position of FIGURE 1A. In this position the adjusting bolts 26 and 29 are set so that there shall be small substantially equal clearances 37, 38 between the heads of said bolts and the cooperating tongue 34 when both valve actuating plungers are in the "closed" position. Referring now to FIGURE 1A, if the lever 32 is moved "forward" in the direction of the arrow marked F, the piston 16 will move to the right relative to the cylinder, and moved in the direction of the arrow R, "reverse," said piston will move to the left end of the cylinder.

In FIGURE 1A, the numeral 39 indicates generally a plate cam having a straight portion 40, and a curved part 41 secured to the piston rod clevis 18 by a pin passing through the inner clevis hole 19 aforesaid.

FIGURES 4 and 5 show the straight portion 40 of the plate cam 39 in elevation and plan respectively, said straight portion having the shaped upper surface 40A, and the straight lower surface 40B. Shaped upper surface 40A has the central depression indicated at N'. To the right of N', said upper surface slopes upwards as shown at 42 to a high at 43, thence downwards as shown by the numeral 44 to the shoulder 45. The portion of the cam upper surface 40A to the left of N', indicated generally by 46, is similar in shape to the right hand portion described so that said upper surface is symmetrical either side of N'.

On a side of said cam are blocks 47 and 48 equidistant from N', which blocks are drilled and tapped to receive the bolts 49 and 50, provided with locknuts 51, 52. The distance between the ends of said bolts is indicated by the letter M, FIGURE 4, which distance is seen to be adjustable by means of the aforesaid bolts.

As shown in FIGURES 1A and 2, on a side of the cylinder 10 are formed raised portions 58 and 58A having grooves 57, 57A, wherein is slidable the lower edge 40B of said plate cam 39.

Referring now to FIGURE 2, lever 32 is drilled at 53 to receive the cylindrical cam follower plunger 54. The position of 53 is such that said plunger, which is urged strongly downwards by the means 55, 56 shall cooperate with the surface 40A of the plate cam 39, as said cam moves slidably in the grooves 57, 57A.

In FIGURES 1A and 3, the line N there shown represents a plane normal to the axis of the piston rod 17. In FIGURES 1A and 3, the lever 32 is vertical, i.e. is in the plane N and the piston 16 is in mid stroke. In this position the plane N contains the line N' of FIGURES 4 and 5.

Operation of the power assist device is as follows, having reference to a marine reversing gear of a common type having a lever, herein referred to as the shift lever to distinguish it from the lever 32, motion of which shift lever forward engages the forward drive, and motion of which lever in the opposite direction, towards the stern of the vessel, engages the reverse drive. In a central position, the gear is in neutral.

The cylinder 10 is attached in any convenient manner to the shift lever, suitably by an obvious link having a connecting pin to engage hole 14 at the extreme left of my device, see FIGURE 1A. The clevis 18 is attached to a fixed part of the marine installation suitably by means of a second connecting pin engaging outer clevis hole 20 provided for that purpose. It is to be noted that the connecting pins aforesaid permit swinging motion about both points of attachment.

Attachment to the shift lever is at a point such that the arcuate motion of that point as said shift lever is moved from forward through neutral to reverse corresponds to slightly less lineal motion than the full stroke of the piston 16 with respect to its cylinder. The point of attachment of the piston rod clevis 18 is such that, shift lever being in neutral, lever 32 is also in the neutral position N of FIGURE 1A.

It is seen that admission of air to either side of the piston will cause the cylinder to move with respect to the piston, the latter being stationary—excepting for swing resulting from arcuate motion, as aforesaid, of the point of attachment at the shift lever. With the motion of translation of the cylinder with respect to the stationary piston, the shift lever is caused to move forward or backward as the case may be.

To engage reverse, the lever 32 is moved in the direction R. This will cause lever tongue 34 to urge the plunger 28 inwards to the "open" position admitting air through 32A causing the cylinder, and with it the shift lever, to move to the right. The lever 32, being attached to the cylinder, will also move to the right so that one must continue to pull the moving lever.

Initially, the resistance encountered will only be that necessary to move the plunger 28. But as the motion of the cylinder commences the cam 39, being fixed, will move slidably with respect to the cylinder. Thus the cam follower 54 (FIGURE 2) urged strongly against the cam surface will commence to travel along the slope 42 increasing the resistance, so that the lever 32 will have to be pulled more strongly backwards. When the high 43 is passed, the follower is on the downward slope 44 having the opposite effect, that is the pull required will materially decrease and, depending upon the steepness of the slope 44 and the strength of the spring 55 (FIGURE 2) will require no further backward pull upon the lever 32 to complete the engagement.

As the piston approaches the end of its stroke, the cam bolt 50 strikes the lever 32 automatically moving it towards the neutral position cutting off the flow of air through passage 32 and terminating the stroke in the engaged position of the shift lever.

To disengage reverse, the lever 32 is pushed forward, direction F, when the plunger 25 will be pressed to the open position causing motion in the opposite direction. As before, initial resistance will increase as the cam follower now rises upon the slope 44 and, after the high 43 is passed, little or no forward pressure will be required since the effect of the slope 42 will be to urge the lever 32 forward tending to hold valve plunger 25 in the open position. As the low point N' is reached lever 32 will of itself regain the N position with both valve plungers closed and the shift lever in neutral.

The action in engaging and disengaging forward is as above described, but with opposite motions.

As shown in FIGURE 4, the high 43 is central of the right hand portion of the shaped upper cam surface 40A, and 40A is symmetrical either side of N'. Depending upon the particular marine gear being controlled, 43 may be either side of this central positon, and the two sides may or may not be symmetrical.

Referring now to FIG. 4, it will be seen that the maximum distance M, attained when 49 and 50 are separated as far as possible, is required to be such that the full useful stroke of the piston 16 may be accomplished.

It will also now be seen that the attachment of the device to the marine gear operating lever is required to be made at a point on that lever where the total travel thereof between full engage forward and full engage reverse is somewhat less than the maximum value of M. Then the bolts 49 and 50 may be nicely adjusted to the proper separation.

As best seen in FIGURE 3, the exact position of disengagement may be adjusted by screwing the left valve plunger adjusting bolt 26 for example, outwards, and screwing the right hand adjusting bolt 29 inwards a corresponding amount. Different clearances 37 and 38 will produce optimum action with different installations, the said clearances are adjustable as has been explained.

It will be appreciated by those familiar with manually engaged marine reverse gears, that the initially greater resistance in moving the lever from neutral is simulated by the resistance caused by the slopes, such as 42, at either side of neutral, and that a substantially self-engaging action towards the end of the shift lever motion (in either direction) may be simulated in my power assist device.

Some manually operated marine reversing gears when fully engaged in either direction will, after a strong initial pull of the operating lever, substantially disengage themselves. This action too, as has been explained, may be attained and the feel simulated in the subject power assist device.

Referring to FIGURE 1, the double acting hydraulic cylinder 61 has a piston, and the piston rod 62 passing through one end of the cylinder. As best seen in FIGURE 7, a second similar cylinder 63 has the piston rod 64. The external ends of both piston rods are bolted to the cross member 65, formed on one end of the operating rod 66, which is rectangular in cross section. As seen in FIGURE 1, the hydraulic control device 67 is connected by the lines 68, 69 to the left and right hand ends, respectively, of the cylinder 61. The manual control device 67 is operated by the lever 70 the neutral central position of said lever is designated A. The force to urge the hydraulic fluid through the lines to operate the cylinder arises from the force applied to the lever. When the lever 70 is moved to the right through the broken line positions A–1, A–2, the piston rod 62, and the attached operating rod 66, will move to the right. When lever 70 is moved from A–2 past neutral through A–3 to A–4, the operating rod will move to the left. A second similar hydraulic control device 71 having a control lever 72 is provided at a convenient location, and is connected to the cylinder 73 by the lines 74, 75. The piston rods 62, 64 being coupled by the cross member 65 (see FIGURE 7) both rods move together, hence movement of control lever 70 will cause corresponding movement of control lever 72 of the second hydraulic control device, or alternatively movement of the piston rods may be effected by control lever 72 in which case lever 70 will reproduce the movement of 72. The foregoing hydraulic arrangements are conventional.

The operating rod 66 extends from the cross member 65 through a supporting member indicated generally by the numeral 75, as shown in FIGURE 1. As best seen in FIGURE 7 said supporting member has a base 76, a central web 77, and the spaced bracket 78 and 79, the top of bracket 78 adapted to form, with cap 80, a rectangular aperture in which the rod 66 is slidable. The bracket 79, has a cap 81 similar to the cap 80 so that the rod 66 is slidable through the end brackets. Centrally between the two brackets the web 77 is drilled to receive a shaft 82A, which shaft is seen in FIGURE 8 only. Upon each end of said shaft is a bushing, one said bushing 83A appears in FIGURE 8 only. The shaft is rigidly secured in the web 77, the bushings are freely rotatable upon the shaft. The fork 84 and the crank arm 85 at right angles thereto form inner and outer legs, respectively, of a first bell crank mounted upon one said bushing, both arms of which are secured to the bushing to rotate with it. The fork, arm and bushing assembly is retained upon the shaft by bolt and washer means 82, 83. To a similar bushing 83A on the opposite end of the shaft 82A are attached the fork-cam member 86 and the crank arm 87 to form inner and outer legs of a second bell crank. This assembly is secured to the shaft by bolt and washer means (not shown) similar to 82, 83, It is seen that rotation of 86, 87 is independent of rotation of the fork 84 and its arm 85.

FIGURE 1 shows the controls in the central, or neutral, position. In this position piston rods 62 and 64 are in the middle of their range of motion. The cam operating rod 66 has rigidly attached to its upper side the block 89. The point of attachment of the block 89 to the rod 66 is such that in the neutral position the block is centered between the brackets 79, 80 immediately above the shaft 82A.

As seen in FIGURE 7, upon one end of said block is formed the cylindrical portion 90 for engagement with the fork 84, so that longitudinal travel of the rod 66 causes rotation of the fork arm assembly 84, 85.

As best shown in FIGURE 8, the fork-cam member has the parallel faces 91, 92 defining sides of a slot 93 to co-operate with the block 89, and the inclined faces, or flats, 94, 95. The fork-cam member 86 is symmetrical about its centreline 96, the inclined faces 94, 95, making an angle of some sixty degrees therewith. When the control lever 70 FIGURE 1 is moved to position A–3, rod 66 will move to the left so that the block 89 will move to FIGURE 8 broken line position 89–A–3. This will cause the fork-cam 86 to rotate to the broken line position shown. If the motion of 89 continues to the left, as for example when control lever 70 is moved to A–4, it is seen that the flat underside 97 of the block 89 will engage the fork-cam surface 95 preventing further rotation of 86— but the fork arm assembly 84, 85 will continue to rotate. Thus motion of 86 is restricted to some thirty degrees either side of the centre line 96, notwithstanding control lever 70 is moved through its full range from A–2 to A–4.

Connections to a typical marine power installation are shown diagrammatically at small scale in FIGURE 1B. Connections from the control apparatus indicated generally by the numeral 9 (in FIGURE 1 only) to an operating lever 107 (FIGURES 1 and 9) of a marine governor or other speed regulating device of a marine motor are as indicated. Connection of the power assist device 10 (FIGURE 1) to a lever 32A operating the reversing gear are by any convenient linkage means, 14–A, secured to the power assist device as previously explained.

The arm 87 is adapted for attachment of obvious linkage 98, 99, 100, 101, 102, connected to the power assist operating lever 32 whereby the motion of the arm 87 is caused to actuate the power assist device 10, which in turn operates the marine reverse gear, as before described. It is to be understood that the said obvious linkage is such that the full movement of 86–87 either side of the centreline, some 30°, corresponds to the full travel of the lever 32 either side of the neutral position. It is to be noted that the feel of gear engagement simulated and transmitted to the lever 32 by the plate cam 39 will appear as differences in resistances to the longitudinal motion of the operating rod 66, and in turn be transmitted through the incompressible hydraulic fluid to appear at the lever 70 of the hydraulic remote control device as that lever is moved to engage or disengage the reversing gear.

Referring now to FIGURE 1, attached to the arm 85 is the spring link 104 comprising a hollow cylindrical part 105 within which the rod part 106 is slidable for a restricted distance. Within the cylinder 105 is a helical spring (not shown) whereby the rod part is urged outwards to the full extent of the relative motion of rod and cylinder. Thus the link 104 will decrease in overall length upon encountering sufficient resistance to overcome the action of the spring aforesaid. The extremity of the rod member 106 is attached to the top of the operating lever 107 of a marine governor, or other speed regulating device, of conventional type, such as, for example, the Single Lever Variable Speed Governor manufactured by General Motors. The motion of the lever 107 controls the speed of the prime mover, shown in FIGURE 1B only.

In the solid line position of FIGURE 1, the governor operating lever is in the closed or slow position, and the rod member 106 of the spring link 104 is in about the middle of its range of motion with respect to the cylinder portion 105.

When the control lever A of control 67 is moved to position A–1, arm 85 moves to the broken line position 85–A–1, 30° from the neutral position of block 89. As before explained, this 30° motion rotates the fork cam 86 to the full extent of its range, being restrained from further motion by the locking action of the block member 91 upon the fork-cam flat 94. In position A–1 of the arm 85, spring link 104 is fully extended, that is rod member 106 thereof is at the full extent of its outward motion with respect to 105. It is to be noted that the governor operating arm has no yet moved, but that the power assist device has caused reverse to be engaged. Continued motion of the control lever 70 past A–1 towards A–2 will move 85 from the A–1 position towards the A–2 position. As the spring link 104 is fully extended at position A–1, the movement towards A–2 will cause the governor operating lever 107 to rotate counter clockwise so increasing engine speed.

Thus, initial motion of control lever 70 engages reverse, or forward as the case may be, without moving the governor operating lever from the slow or idle position, while further motion of the control lever 70 increases engine speed through motion of the governor operating lever.

In FIGURE 1, the independent control device 108 having the control lever 109 is connected by the lines 110, 111 to the hydraulic cylinder 112 of which the rod 113 is attached to the governor operating lever 107 by a slotted link 114, this provides independent speed control as is explained below.

The rod part 106 is, as seen in FIGURE 1, attached to the upper side to the governor operating lever 107, while the slotted link 114 is attached to the lower side thereof. FIGURE 9 is a schematic plan view of the governor and the slotted link, the spring link 104 removed. Slotted link 114 has a slot 115 the length of which is sufficient to permit movement of the lever 107 from the position shown to full open, the broken line 116 indicates the centre line of lever 107 in the full open position. The slotted link 114 is not rigidly attached to the rod 113, but is obviously so mounted as to permit a few degrees of rotation; in the plane of FIGURE 9, between rod and link to permit full motion of 107 without binding. Lever 107 is provided with spring means indicated schematically by the numeral 117, whereby said lever, if free, would return to the solid line idle or slow position shown.

The independent governor control operates as follows. In the solid line FIGURE 1 position the rod member 106 is as previously explained, in about the middle of its range of motion with respect to the cylinder portion 105 of the spring link 104. Thus, control lever 109 is moved forward (counter clockwise) from the position shown, the slotted link 114 (FIGURE 9) will cause the governor operating lever 107 to move towards the position 116 and, in so doing, will compress the spring link 104.

In the gear engaged position, for example position A-1 of FIGURE 1, as explained the spring link 104 is fully extended and the lever 107 has not thereby been moved from the idle or slow position. Independent control may still be effected by motion of the control lever 108, as explained above the spring link 54 will again be compressed.

In the full speed position A-2 (or A-4) the governor operating lever 107 will have assumed position 116 FIGURE 9. Motion of the independent lever 109 will cause the slotted link 114 to move to the left, but this will not affect 107—which will remain at the position indicated by 116. Remote hydraulic means, such as described, are preferred to impart longitudinal movement to the operating rod 66, and to actuate the independent governor control linkage. It is to be understood however that these motions may be effected in other ways, such as for example cable and pulley means, to accomplish the objects and advantages of the invention. Hydraulic fluid being incompressible, as explained the hydraulic system preserves the feel of engagement and disengagement. With cable means some of the feel is lost from extensibility, and some slackness or lost motion.

What I claim is:

1. Control apparatus for a marine installation having a motor, a lever operated marine reversing gear; and a lever operated speed regulating device; in combination with the foregoing,
   (a) a power assist device actuated by a lever, said power assist device operatively connected to the gear,
   (b) a supporting member having a first and second bell crank each with an inner and an outer leg, said bell cranks mounted for independent rotation, means cooperating with one leg of each bell crank whereby both bell cranks are simultaneously rotatable through a limited arc in either direction from a central position, the said means locking one of the legs of the first bell crank at the extremity of an arc aforesaid whilst continuing to rotate the second bell crank through a further arc, the remaining leg of the first bell crank, the motion of which is limited, operatively connected to the power assist lever, the remaining leg of the second bell crank operatively connected to the speed regulating device lever,
   (c) a remote control device having a lever and means operatively connecting the lever thereof to the bell cranks, constructed and arranged so that movement of the said lever effects bell crank rotations as aforesaid.

2. A supporting member having a base, spaced brackets on the base, a central web, a shaft transversely through the web, journalled at one end of the shaft a first bell crank having inner and outer legs, a fork forming the inner leg of the first bell crank, journalled at the other end of the shaft a second bell crank having inner and outer legs, a fork-cam forming the inner leg of the second bell crank, an operating rod slidable longitudinally through the spaced brackets, a block attached to the operating rod which block is adapted to engage both said inner legs to cause them to rotate as the said operating rod is moved in either direction, the fork-cam adapted to lock against the block after limited motion of the operating rod in either direction so that continued motion of said rod shall further rotate the said fork only.

3. As claim 2, the fork-cam member having parallel faces defining sides of a slot symmetrical about a centreline, the block adapted to engage the slot portion for rotation and to engage an outer face to lock against further rotation.

4. Apparatus as claimed in claim 1 the power assist device comprising; a double acting cylinder having a piston, a piston rod passing through one end of the cylinder, a valve to control admission and exhaust of a fluid under pressure, a lever movement of which actuates said valve, means to attach the piston rod to a fixed external point, plate cam means cooperating with said lever to provide varying resistance to the motion thereof.

5. Apparatus as claimed in claim 4, the valve having a plunger, the power assist lever having a tongue adapted to cooperate with said plunger, a groove upon an external wall of the cylinder, the cam having a surface slidable in said groove and a shaped surface, a cam follower on the power assist lever and means to urge the follower against the shaped surface, said surface having a central depression, upon each side of the depression a high, the shaped surface sloping away from each high.

6. Apparatus as claimed in claim 1, the means operatively connecting said remaining leg of the second bell crank to the speed regulating device lever to comprise, a spring link adapted to move said lever upon rotation of the second bell crank through the further arc aforesaid, the lever remaining stationary during rotation through the said limited arc.

7. Apparatus as claimed in claim 6, the supporting member having a base, spaced brackets on the base, a central web, a shaft transversely through the web, the first bell crank being journalled at one end of the transverse shaft, the second bell crank being journalled at the other end of the shaft, a fork-cam forming the inner leg of the second bell crank, an operating rod slidable longitudinally through the spaced brackets, the lever operated remote control device operatively connected to the operating rod to cause longitudinal movement thereof, a block attached to the operating rod which block is adapted to engage both said inner legs to cause them to rotate as the rod is moved in either direction, the fork-cam adapted to lock against the block after limited motion of the rod in either direction so that continued motion of the rod shall further rotate the said fork only.

8. Apparatus as claimed in claim 7, said fork-cam having parallel faces defining sides of a slot symmetrical about a centreline, and inclined outer faces making an acute angle with the centreline.

9. Apparatus as claimed in claim 8, and independently operable means to control the speed regulating device by moving the lever thereof, said independent means to comprise a link having a longitudinal slot cooperating with the speed regulating device lever, the slot adapted to permit free operation of the lever by the aforesaid second bell crank means, the before mentioned spring link adapted to permit the independent means to operate the speed regulating lever upon movement of the slotted link.

10. Apparatus as claimed in claim 9, the lever operated remote control device being hydraulic, to cooperate with a hydraulic cylinder operatively connected to the operating rod to cause longitudinal motion thereof.

No references cited.

DON A. WAITE, *Primary Examiner.*